(No Model.) 2 Sheets—Sheet 1.
T. W. MORGAN & J. C. TOLSON.
THRASHING MACHINE.
No. 357,495. Patented Feb. 8, 1887.
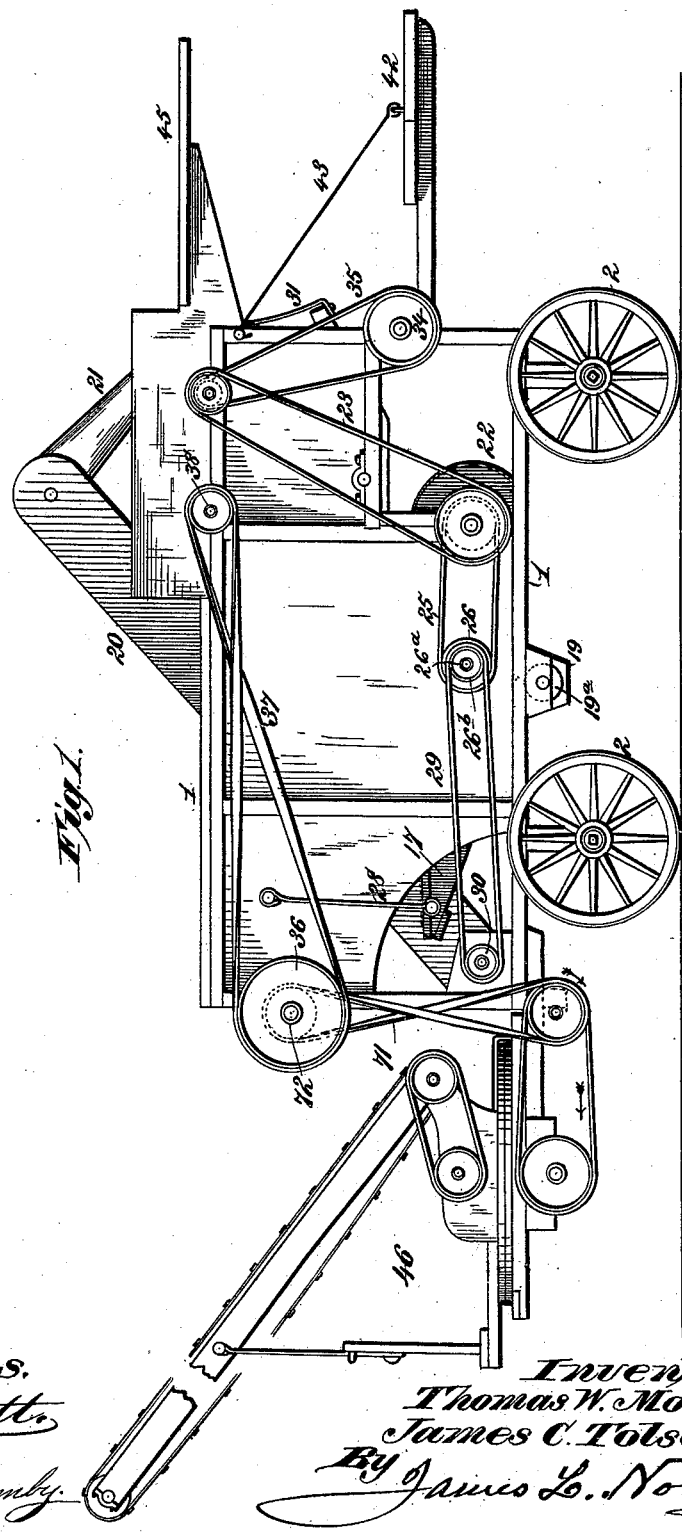
Witnesses.
Robt Swatt.
Dennis Sumby.
Inventors.
Thomas W. Morgan
James C. Tolson.
By James L. Norris.
Atty.

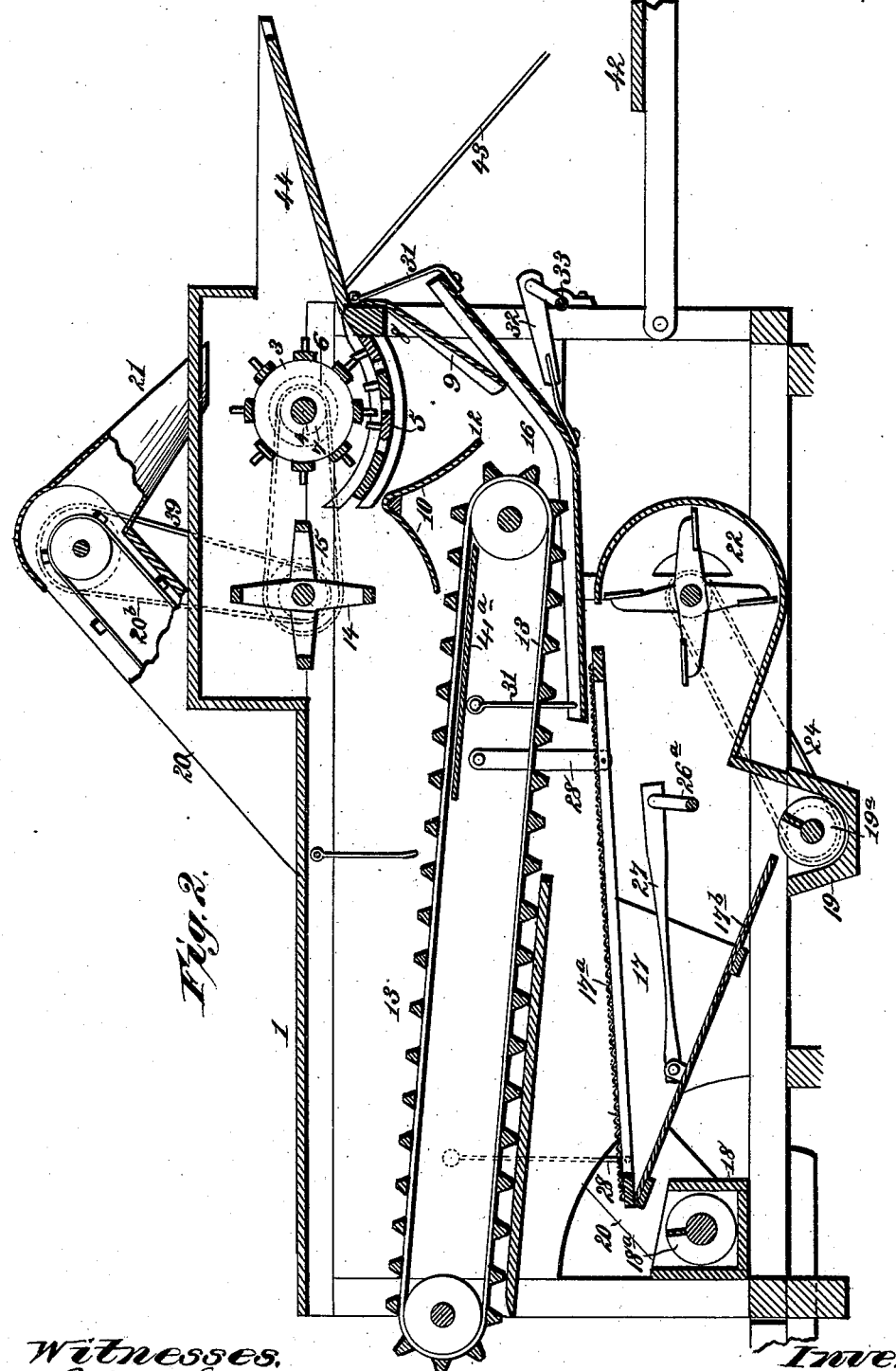

UNITED STATES PATENT OFFICE.

THOMAS W. MORGAN AND JAMES C. TOLSON, OF GLASGOW, MISSOURI.

THRASHING-MACHINE.

SPECIFICATION forming part of Letters Patent No. 357,495, dated February 8, 1887.

Application filed April 5, 1886. Serial No. 197,863. (No model.)

*To all whom it may concern:*

Be it known that we, THOMAS W. MORGAN and JAMES C. TOLSON, citizens of the United States, residing at Glasgow, in the county of Howard and State of Missouri, have invented new and useful Improvements in Thrashing-Machines, of which the following is a specification.

This invention relates to thrashing-machines; and it consists in the novel construction and combination of devices, hereinafter described and claimed, reference being made to the accompanying drawings, in which—

Figure 1 is a side elevation of a thrashing-machine embodying our invention. Fig. 2 is an enlarged longitudinal section of the thrasher.

The frame of the machine is designated by the numeral 1, and, as shown in Fig. 1, may be supported on wheels 2, as usual. The frame 1 is preferably rectangular, or nearly so, about ten feet (more or less) in length, and is made with close-fitting walls, so as to be practically dust-proof.

In the upper part of the thrasher at one end is located the cylinder 3, which is mounted on a shaft, 4, that carries at one end a large pulley, 6, and a small pulley, 7, said pulleys being shown by dotted lines in Fig. 2. The cylinder 3 is driven by belting applied to the pulley 6, and leading from a pulley on an engine. (Not shown.) Beneath the cylinder 3 is a perforated concave, 5, which is adjustable toward and from the cylinder by any ordinary means.

To the cross-bar 8, at the front of the concave, is secured a downwardly and rearwardly inclined plate, 9, having flanged sides, as shown in Fig. 2, and beneath the rear edge of the concave is suspended a double-inclined stationary plate, 10, the front side of which serves, in conjunction with the plate 9, to form a hopper, 12, to direct the passage of the grain that falls through the concave.

Beneath the double-inclined plate 10 is arranged the receiving end of the traveling straw-carrier 13, which inclines upwardly and rearwardly to the other end of the machine. This carrier 13 takes the straw direct from the cylinder and concave and conveys it to the stacker, as hereinafter explained.

In rear of the cylinder 3 and above the straw-carrier 13 is a rotary beater, 14, which separates any grain which may have escaped with the straw. The beater-shaft has a pulley, 15, which is driven by a belt from the pulley 7 on the cylinder-shaft, as shown by dotted lines in Fig. 2.

Suspended beneath the hopper 12 is a vibratory pan or shoe, 16, which receives the grain from the cylinder, concave, beater, and straw-carrier and conveys it to a vibratory shoe, 17, that occupies the larger part of the space in the lower portion of the thrasher. This shoe 17 is formed with an upper sieve portion, 17$^a$, that inclines slightly rearwardly and downwardly to a tailings-trough, 18, and a lower closed portion, 17$^b$, that inclines downward and forward to the grain-trough 19.

The tailings-trough 18 is located at the lower rear portion of the machine and contains a screw-conveyer, 18$^a$, that communicates with the lower end of an elevator, 20, by which the tailings are returned to the cylinder through the spout 21, to be worked over.

The grain-trough 19 is located at about the central lower portion of the thrasher, and contains a screw-conveyer, 19$^a$, by which the separated grain is discharged into bags at the side of the machine.

In front of the shoe 17 and grain-trough 19 is a fan, 22, which is driven by belting 23 from the cylinder-shaft, as shown in Fig. 1. The grain-conveyer 19$^a$ is driven by belting 24 from the fan-shaft, as shown in Fig. 2, and the shoe 17 is also driven from the fan-shaft by belting 25, as shown in Fig. 1, the belt 25 being engaged with a pulley, 26, on a crank-shaft, 26$^a$, Fig. 2, which is connected with the shoe by a pitman, 27, whereby the shoe is vibrated, said shoe being suspended by links 28, so as to be capable of an oscillating or vibratory movement beneath the straw-carrier. On the crank-shaft 26$^a$ is also a pulley, 26$^b$, for the belt 29, passing to a pulley, 30, Fig. 1, that drives the tailings-conveyer.

The vibratory shoe or pan 16 is suspended by links 31, and is connected by a pitman, 32, to a crank-shaft, 33, Fig. 2, which is journaled at the front end of the machine and carries a pulley, 34, through which it is driven by belting 35 from a pulley on the cylinder-shaft.

The straw-carrier 13 is driven by means of a pulley, 36, at its rear end, by crossed belting 37 from a pulley, 38, on one end of the beater-shaft, as shown in Fig. 1, and the opposite end of the beater-shaft carries a pulley for engagement of belting 39, by which the elevator apron or belt 20ᵇ is driven, as shown in Fig. 2.

To the feed end of the machine is attached a removable elevated platform, 42, the weight of which is partly sustained by suspension-rods 43. The operator stands on this platform and feeds the severed sheaves to the cylinder over the inclined table 44, taking care to spread the straw so it will pass into the machine readily. On each side of the chute 44 is preferably arranged a table, 45, for receiving the sheaves that are passed to the operator by an attendant.

The straw passes from the cylinder direct to the carrier 13, while the grain passes through the concave 5 and hopper 12 to the vibratory shoe 16, and thence to the shoe 17 and grain-trough.

The straw that is discharged from the rear end of the carrier 13 is received on a straw-stacker, 46, which is of any ordinary construction and detachably connected to the rear end of the thrasher-frame.

What we claim as our invention is—

The combination, with the cylinder, concave, beater, and straw-carrier, of a vibratory riddle, a vibratory shoe suspended beneath the concave, and a hopper arranged between the concave and shoe, its rear side consisting of a double-inclined plate suspended beneath the rear edge of the concave and partially above the straw-carrier, substantially as described.

In testimony whereof we affix our signatures in presence of two witnesses.

THOMAS W. MORGAN.
JAMES C. TOLSON.

Witnesses:
J. M. NORRIS,
E. R. BARTON.